C. A. Peavey.
Flexible Locomotive and Tender Coupling.
N° 103,494. Patented May 24, 1870.
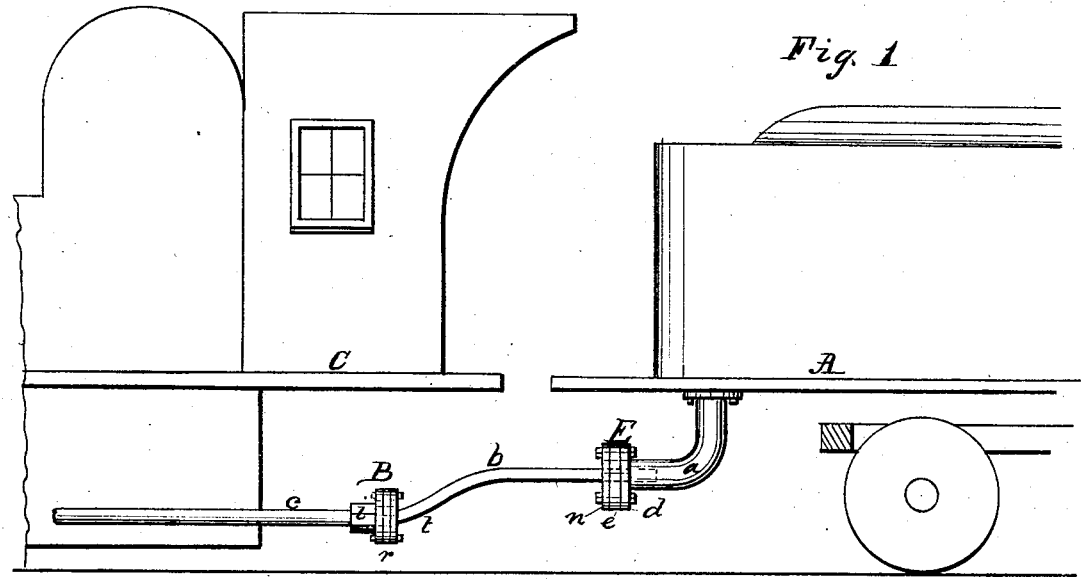
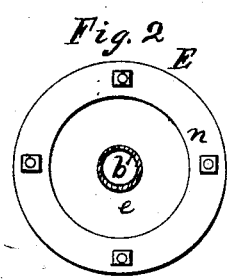
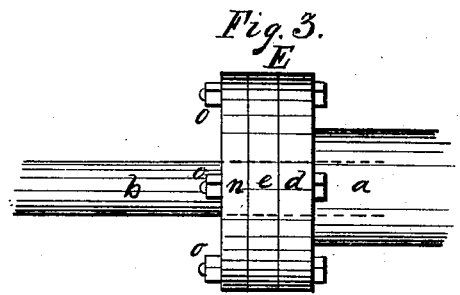
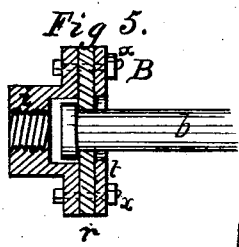
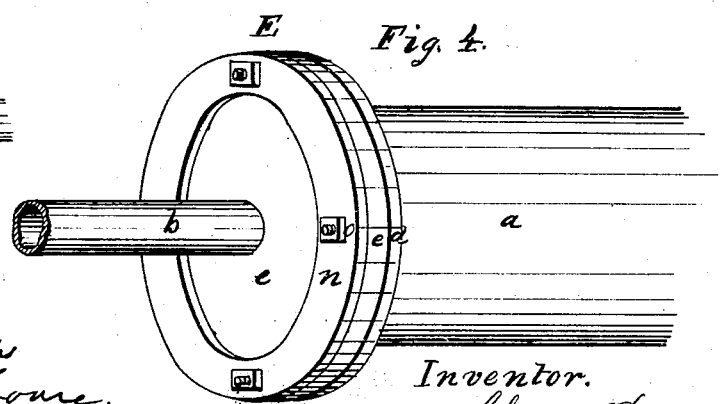
Witnesses.
Thos. H. Hutchins
Henry Lowe
Inventor.
Charles A. Peavey

United States Patent Office.

CHARLES A. PEAVEY, OF JOLIET, ILLINOIS.

Letters Patent No. 103,494, dated May 24, 1870.

FEED-WATER CONNECTING-PIPE FOR LOCOMOTIVES.

The Schedule referred to in these Letters Patent and making part of the same.

Be it known that I, CHARLES A. PEAVEY, of the city of Joliet, in Will county and State of Illinois, have invented a new and useful Improvement on the Connecting Feed-Pipe and Joints for Locomotive-Engines; and I do hereby declare the following to be a full, clear, and exact description of the same, reference being had to the annexed drawings making a part of this specification, in which—

Figure 1 is a side elevation, showing its connection with the engine and tender;

Figure 2, a front elevation of the flexible joint E;

Figure 3, a side elevation of the same.

Figure 4, a perspective view of the joint E; and

Figure 5, a longitudinal sectional view of the flexible joint B.

My invention consists in a device to use as a substitute for the feed-pipe hose which connects the locomotive-engine boiler with the water-tank on the tender, for the purpose of supplying water to the boiler, the construction and operation of which I will proceed to explain.

It is well known that the rubber or leather hose which is used for that purpose is continually wearing out, and, if the engine should become disengaged from the tender, is entirely spoiled, and must be replaced with a new hose, at great expense.

To remedy this defect, I use a metal tube, $b$, in connection with flexible joints, at each end of the tube, marked B and E.

The joint E consists of the flange $d$, on the end of the elbow $a$, rubber head $e$, and flat ring $n$, the whole being held together by means of the bolts $o$, as shown in the figures.

The rubber head $e$ is perforated by a hole at the center, to admit the end of the tube $b$, which passes in to some little distance, as shown by the dotted lines in figs. 1 and 3.

The aperture is small enough so the rubber $e$ will press the tube $b$ sufficiently hard to make a water-tight joint.

The elbow $a$ is larger in diameter than the tube $b$, so there will be room for the motion of that end of the tube, caused by the oscillation of the locomotive and tender, so it will not strike the sides of the elbow $a$.

The tube $b$ passes into the elbow to some distance, as before stated, so the ordinary motion of the engine and tender with each other will not pull it out, unless, in case they should become separated, it is intended it shall pull out of the joint and not injure the parts.

The joint B is constructed and operates in a similar manner, except that it is not intended the tube $b$ shall pull out, but, at the same time, be flexible.

The tube is constructed on this end with a flange, which fits loosely into a corresponding recess in the nut $i$, fig. 5.

$r$ is a rubber head, perforated in the same manner as $e$, fig. 4, and admits the tube $b$, about which it fits closely next the flange, to make a water-tight joint.

$t$ is a flat ring, through which the bolts $x$ pass, to hold the whole firm together, as shown in fig. 5.

It will be observed that, by this joint, the tube $b$ cannot pull out, but will be flexible, and permit the oscillations of the engine and tender without leakage or injury to its parts.

Should the aperture in the rubber heads $r$ and $e$ get worn, so as to cause a leakage, a tightening up of the bolts will compress the rubber and lessen the aperture, so the joints will be tight again.

Claims.

Having thus described my invention,

What I claim as new, and desire to secure by Letters Patent, is as follows:

1. The flexible joint E, consisting of the parts $d$, $e$, $n$, and $o$, constructed and operating substantially as and for the purposes set forth.

2. The flexible joint B, consisting of the parts $i$, $r$, $t$, and $x$, constructed and operating substantially as and for the purposes set forth.

3. The combination of the metal tube $b$, flexible joint B, and flexible joint E, constructed, operating, and arranged as and for the purposes set forth.

CHARLES A. PEAVEY.

Witnesses:
   THOS. H. HUTCHINS,
   HERVEY LOWE.